United States Patent [19]

Pietramale

[11] 3,722,292
[45] Mar. 27, 1973

[54] PIVOTED FLOAT HYDROMETER COMPRISING MOVABLE CALIBRATION WEIGHT

[75] Inventor: Anthony M. Pietramale, Wheeling, Ill.

[73] Assignee: I - T - E Imperial Corporation, Chicago, Ill.

[22] Filed: Oct. 31, 1968

[21] Appl. No.: 772,119

[52] U.S. Cl. ................................................. 73/454
[51] Int. Cl. ............................................. G01n 9/30
[58] Field of Search ............ 73/454, 451, 452, 453, 1; 177/173, 176, 175; 222/215; 128/276

[56] References Cited

UNITED STATES PATENTS

| | | | |
|---|---|---|---|
| 2,674,120 | 4/1954 | Trainor | 73/454 |
| 2,674,119 | 4/1954 | Trainor | 73/454 |

*Primary Examiner*—Richard C. Queisser
*Assistant Examiner*—C. E. Snee, III
*Attorney*—Hofgren, Wegner, Allen, Stellman & McCord

[57] ABSTRACT

An antifreeze tester having a chamber for receiving antifreeze fluid to be tested and pivoted float means responsive to the specific gravity of antifreeze fluid within the chamber to indicate the freeze point thereof. An adjustable weight is provided on the float means for accurately calibrating the tester. An improved handle construction is provided for facilitated readout of the indicating means. The handle comprises a collapsible bulb structure for effecting movement of the antifreeze fluid to and from the chamber. The handle is further arranged to effectively cause the tester to be utilized in an upright position for improved test accuracy.

9 Claims, 5 Drawing Figures

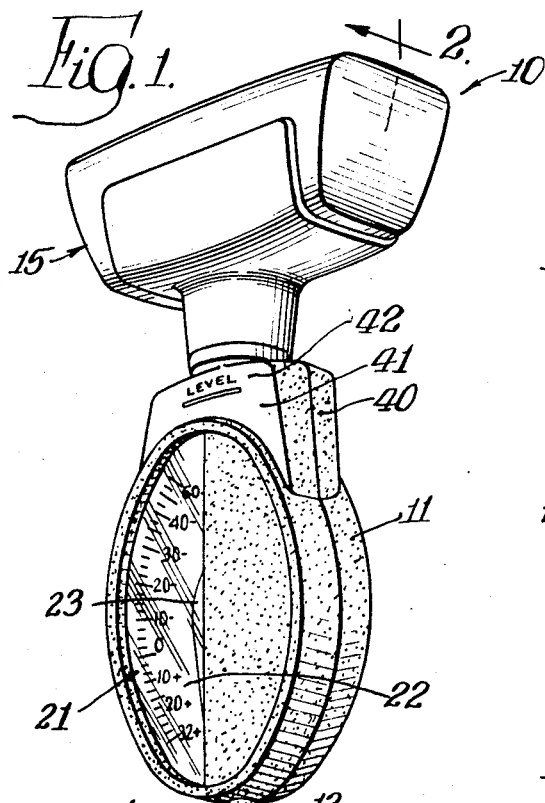
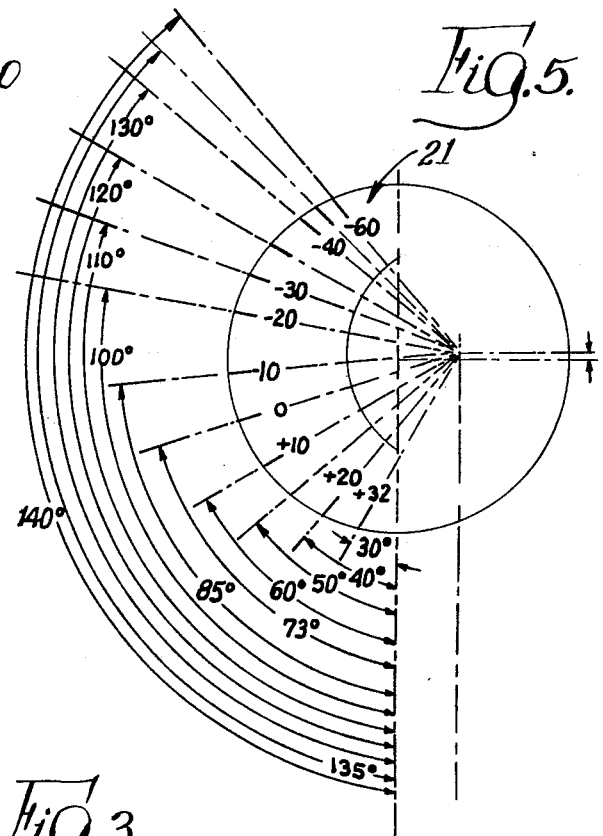
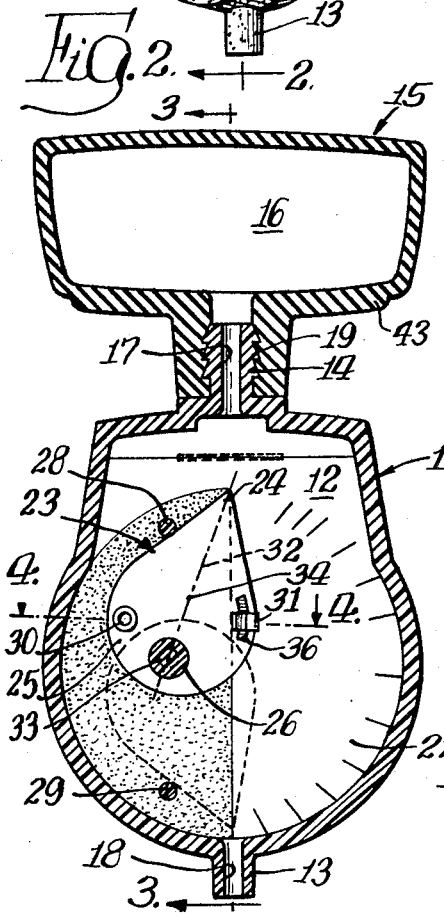
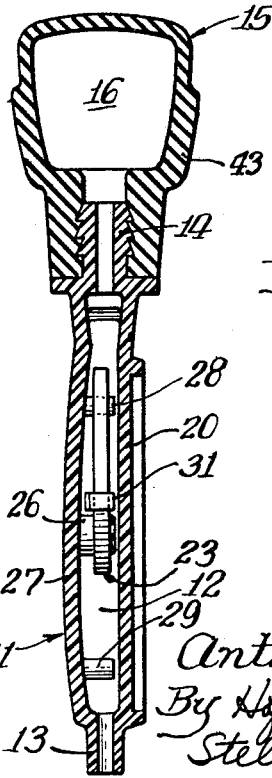
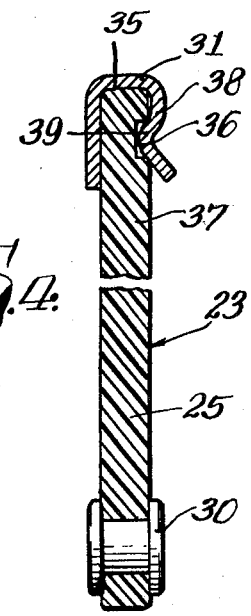
Inventor:-
Anthony M. Pietramale
By Holgren, Wegner, Allen,
Stellman & McCord Attys.

PIVOTED FLOAT HYDROMETER COMPRISING MOVABLE CALIBRATION WEIGHT

BACKGROUND OF THE INVENTION

1. Field of the Invention

This invention relates to fluid testers and in particular to testers utilizing pivotally mounted floats for indicating the specific gravity of a fluid such as an antifreeze fluid.

2. Description of the Prior Art

In conventional antifreeze testers utilizing pivotally mounted floats, the variations in the tester elements cause deviations of the indicated readings from the correct readings so that an accurate test of the antifreeze solutions is not assured. Relatively complex devices have been employed for improving the accuracy of such testers, including circular discs rotatably supported on the float. Such devices have the serious disadvantage of possible failure as by failure of the disc to properly rotate for accurate compensation of the tester parameters. Another disadvantage of the known devices is the relatively complex and, therefore, costly construction thereof.

Further, in conventional antifreeze testers, the handle portion defined by the collapsible bulb structure of the tester adapted to effect the movement of the fluid to and from the testing chamber, permits the tester to be utilized at a substantial angle to the upright which may affect the accuracy of the test reading.

SUMMARY OF THE INVENTION

The present comprehends an improved antifreeze tester having a float indicating means provided with improved means for accurately calibrating the float means for improved accuracy of antifreeze test indication. The invention further comprehends the provision of an improved handle structure in such an antifreeze tester arranged for facilitating reading of the indication means and adapted to urge the use of the tester in an upright position further effectively maximizing the accuracy of the test indication.

More specifically, the invention comprehends the provision in an antifreeze tester having means defining a chamber for receiving antifreeze fluid to be tested, and means for indicating the specific gravity of the antifreeze fluid including a float, means pivotally mounting the float in the chamber for variable pivotal positioning of the float as a function of the specific gravity of fluid in the chamber, and means for visually indicating the pivotal position of the float calibrating means including a weight formed of a material having a specific gravity substantially greater than that of the material forming the float, and means slidably mounting the weight on the float for selectively varying the center of gravity of the float and weight assembly.

Further more specifically, the invention comprehends the provision in an antifreeze tester having means defining a chamber for receiving antifreeze fluid to be tested, means for indicating the specific gravity of the antifreeze fluid including a float, means pivotally mounting the float in the chamber for variable pivotal positioning of the float as a function of the specific gravity of fluid in the chamber, and means for visually indicating the pivotal position of the float, the indicating means defining an upright front reading position, and a carrying means comprising a handle having an elongated dimension transverse to the upright direct and substantially parallel to the front of the indicating means.

BRIEF DESCRIPTION OF THE DRAWING

Other features and advantages of the invention will be apparent from the following description taken in connection with the accompanying drawing wherein:

FIG. 1 is a perspective view of an antifreeze tester embodying the invention;

FIG. 2 is a fragmentary vertical section taken substantially along the line 2—2 of FIG. 1;

FIG. 3 is a fragmentary vertical section taken substantially along the line 3—3 of FIG. 2;

FIG. 4 is a fragmentary enlarged section of the float taken substantially along the line 4—4 of FIG. 2; and FIG. 5 is a diagram illustrating the arrangement of the indicating means.

DESCRIPTION OF THE PREFERRED EMBODIMENT

In the exemplary embodiment of the invention is disclosed in the drawing, a fluid tester generally designated 10 is shown to comprise a housing 11 defining a test chamber 12 for receiving fluid to be tested. In illustrating the invention, the tester 10 is disclosed as being arranged for use in testing the specific gravity of an antifreeze solution so as to provide an indication of the freezing temperature thereof. Thus, the tester is adapted for use in indicating the antifreeze protection afforded by the fluid such as in an automobile engine cooling system.

The housing 11 further defines an inlet nipple 13 and an outlet nipple 14 opening to the chamber 12 at the bottom and top thereof respectively as shown in FIG. 2.

A handle generally designated 15 is secured to nipple 14 and defines a hollow vacuum chamber 16 communicating with chamber 12 through a central passage 17 in the nipple 14. The handle 15 is preferably formed of a resilient material such as ethylene vinyl acetate plastic, and is, thusly, adapted to be manually constricted with the resilience of the handle subsequently effecting a return of the handle configuration to the unconstricted configuration of FIGS. 1 and 2 to form a vacuum in chamber 16 serving to draw a fluid into chamber 12 through an inlet passage 18 in the nipple 13. As shown in FIGS. 2 and 3, handle 15 includes a thick saddle shaped portion 43 controlling the constrictibility of the handle for effectively avoiding inadvertent constriction of the handle by the user. A suitable hose (not shown) may be connected to the nipple 13 for conducting fluid to the nipple 13 as from an automobile radiator. As shown in FIG. 2, nipple 14 is provided with a plurality of annular serrations 19 for positively interlocking the handle 15 in sealed association therewith.

The housing 11 is preferably formed of a transparent material such as a plastic and defines a flat front window 20 having a raised scale 21 thereon. The housing is textured on the inner and outer surfaces to be opaque except for the lefthand portion 22 of the front window.

A movable indicator generally designated 23 is provided in chamber 12 for indicating the strength of the antifreeze fluid as a function of the specific gravity thereof. In the illustrated embodiment, the indicator 23 comprises a float in the form of a disc having a projecting pointer portion 24. The base 25 of the disc illustratively may be segmentally circular. The indicator 23 is pivotally mounted in the chamber on a pivot 26 which may be formed integrally with the rear wall 27 of the housing 11. The indicator disc 23 pivots between an uppermost position shown in full lines in FIG. 2 and a lowermost position shown in dotted lines therein, the swing of the indicator 23 being limited by an upper stop post 28 and a lower stop post 29 which may be formed integrally with the rear wall 27. In moving between the extreme positions of FIG. 2, the pointer portion 24 of the indicator moves behind the scale 21 and the position thereof is observable through the transparent window portion 22.

The indicator disc 23 is preferably formed of a corrosion resistant material such as high density polyethylene plastic. In the illustrated embodiment, the indicator is formed of such a material having a specific gravity approximately between 0.941 and 0.965. It has been found that the use of such a material for the float indicator 23 provides for an automatic temperature compensation as the polyethylene plastic material tends to vary in density in direct correspondence to the variation in density of the antifreeze solution as a function of temperature thereof.

Further accuracy of testing is provided in the tester 10 through the use of a pair of balancing weights 30 and 31 mounted on the float indicator 23. More specifically, weight 30 may be a fixed weight illustratively comprising a rivet extended through the base portion 25 of the float indicator to one side of the plane 32 defined by the pivot axis 33 of pivot 26 and the center of gravity 34 of the float indicator 23 prior to the provision of the weights 30 and 31 thereon. Weight 31 is mounted on the float indicator to the opposite side of plane 32 and is adjustably mounted thereon for facilitated accurate calibration of the tester as by the manufacturer.

More specifically, the balancing means of indicator 23 is illustrated in FIG. 4. As shown, weight 31 embraces the periphery 35 of the base portion 25 adjacent an arcuate groove 36 in the rearward face 37 of the indicator disc 23, paralleling the periphery 35 of the disc. Weight 31 comprises a metal clip having a U-shaped cross-section with one leg 38 provided with an indented portion 39 slidably engaging the disc in the groove 36 for providing a frictional retention of the weight 31 in the manually adjusted position and providing an effectively positive interlock of the weight in association with the disc edge. Thus, the float indicator disc 23 may be readily calibrated by movement of the weight 31 along the groove 36. The weight 31 may be formed of a spring material such as spring temper Type 302 stainless steel.

The housing 11 may be provided with an upper extension 40 having a transparent front face 41, a level indicator 42 for indicating to the user the complete filling of the chamber 12 so as to fully cover the float indicator disc 23 and prevent false reading thereof as by incomplete submergence of the indicator disc.

Constrictible handle 15 is preferably elongated in a direction transversely parallel to the front face of the indicator defined by window 20. Thus, the handle 15 is arranged to cause the user to grasp the same by placing the palm of his hand over the handle with the fingers extending about the rear of the handle and the heel of the palm bearing against the front of the handle. Such a grasping of the handle automatically causes the user to support the tester in a substantially upright arrangement and permits the user to have facilitated observation of the scale portion 21 as the user's forearm may be disposed substantially above the level of the scale. Further, as the majority of such users are righthanded, the user's arm is automatically disposed toward the right of the tester, further providing ready viewability of the scale when the user holds the tester in front of himself in normal use.

As shown in FIG. 5, the scale 21 is calibrated in temperature degrees ranging from a low temperature of −60° F. to a high temperature of 32° F. The scale readings are nonuniformly angularly spaced in conformity with the configuration of the float indicator disc 23 and the arrangement of the pivot axis 33. It should be noted that the widest spacing between scale markings is provided adjacent the 0° indication with the spacing between the scale markings decreasing as a function of the variation of the scale markings from the 0° mark. Thus, the scale is most readily observable in the area found to be utilized most commonly while yet accurate determinations can be made up to the extremes of the movement of the indicator.

In use, the handle of the tester is grasped by the user with the nipple 13 placed in communication with the body of fluid to be tested (as by a connected hose or the like). The collapsible handle is squeezed by a closing of the user's hand thereabout and then allowed to expand under its normal resiliency to suck the fluid through nipple 13 into chamber 12 as a result of the vacuum formation in chamber 16. The normal compression and release of the hollow handle will draw sufficient fluid into chamber 12 to reach the level indicator 41 indicating that the float indicator 23 is fully submerged.

Where the tester is adapted for testing antifreeze fluids, the polyethylene construction of the float indicator 23 automatically compensates for the temperature condition of the antifreeze fluid to provide a specific gravity reading converted into a temperature indication by the scale 21 for indicating to the user the strength of the antifreeze solution in terms of the temperature at which the solution will freeze.

The indication may be readily discernible by the user by virtue of the spaced temperature indicia of scale 21. Upon completion of the test, the user merely resqueezes the hollow handle 15 to force the fluid outwardly from chamber 12 through nipple 13 and back to the supply whereupon removal of the connection to the fluid supply permits the handle to be returned to the normal arrangement of FIG. 1 to complete the test operation.

The tester 10 is extremely simple and economical of construction while yet providing the highly desirable features discussed above. The accurate calibration of the apparatus provided through the use of the adjustable calibrating weight 31 provides high accuracy of the tester and the improved scale 21 provides for facilitated reading. The improved handle construction further assures improved accuracy in the testing operation by virtue of the urging of the user to maintain an upright arrangement of the tester during the testing operation.

While I have shown and described one embodiment of my invention, it is capable of many modifications. Changes, therefore, in the construction and arrangement may be made without departing from the spirit and scope of the invention as defined in the appended claims.

I claim:

1. In an antifreeze tester having means defining a chamber for receiving antifreeze fluid to be tested, and means for indicating the specific gravity of the antifreeze fluid including a float, means pivotally mounting the float in the chamber on a fixed pivot axis spaced from the center of gravity of the float for variable pivotal positioning of the float as a function of the specific gravity of fluid in the chamber, and means for visually indicating the pivotal position of the float, calibrating means comprising:
   a weight formed of a material having a specific gravity substantially greater than that of the material forming the float and having a portion directly movably mounted on the float for selectively varying the center of gravity of the float and weight assembly, said weight comprising a spring clip straddling an edge portion of the float.

2. The antifreeze tester calibrating means of claim 1 further including means defining a recess in the float adjacent an edge portion thereof, said weight having an interlock portion retained in said recess.

3. The antifreeze tester calibrating means of claim 2 wherein said recess comprises an elongate groove extending substantially parallel to the periphery of the float.

4. In an antifreeze tester having means defining a chamber for receiving antifreeze fluid to be tested, and means for indicating the specific gravity of the antifreeze fluid including a one-piece float, means pivotally mounting said one-piece float in the chamber on a fixed pivot axis spaced from the center of gravity of the float for variable pivotal positioning of the float as a function of the specific gravity of fluid in the chamber, and means for visually indicating the pivotal position of the float, calibrating means comprising: a first control weight formed of a material having a specific gravity substantially greater than that of the material forming the float and having a portion directly movably mounted on said one-piece float for selectively varying the center of gravity of the float and weight assembly; and a second control weight fixedly mounted on the float at a portion thereof spaced from the position of said first weight thereon.

5. The antifreeze tester calibrating means of claim 4 wherein said control weights are disposed to opposite sides of the plane defined by said pivot axis of said mounting means and said center of gravity of the float without said weights.

6. In an antifreeze tester having means defining a chamber for receiving antifreeze fluid to be tested, and means for indicating the specific gravity of the antifreeze fluid including a float, means pivotally mounting the float in the chamber on a fixed pivot axis spaced from the center of gravity of the float for variable pivotal positioning of the float as a function of the specific gravity of fluid in the chamber, and means for visually indicating the pivotal position of the float, calibrating means comprising:
   a weight formed of a material having a specific gravity substantially greater than that of the material forming the float and having a portion directly movably mounted on the float for selectively varying the center of gravity of the float and weight assembly; and
   an elongated constrictable hollow handle, said indicating means defining an upright front reading position, said handle extending in its long dimension transversely to the upright direction and substantially parallel to the front of the indicating means, means providing communication between the interior of said handle and said first named chamber whereby manual constriction of said handle may selectively draw or expel antifreeze fluid into or from said first named chamber, and deformation-resistant means extending at least partially about said handle to effectively avoid inadvertent undesired constriction of the handle.

7. The antifreeze tester calibrating means of claim 6 wherein said indicating means is disposed at the left side of the tester when said tester is disposed in the upright reading position.

8. In an antifreeze tester having means defining a chamber for receiving antifreeze fluid to be tested, and means for indicating the specific gravity of the antifreeze fluid including a float, means pivotally mounting the float in the chamber for variable pivotal positioning of the float as a function of the specific gravity of fluid in the chamber, and means for visually indicating the pivotal position of the float, said indicating means defining an upright front reading position, carrying means comprising a hollow, constrictible handle having an elongated dimension transverse to the upright direction and substantially parallel to the front of the indicating means, means providing communication between the interior of said handle and said first named chamber whereby manual constriction of said handle may selectively draw or expel antifreeze fluid into or from said first named chamber, and deformation-resistant means extending at least partially about said handle for controlling the constrictibility of the handle to effectively avoid inadvertent undesired constriction of the handle.

9. The antifreeze tester calibrating means of claim 8 wherein said tester includes means for calibrating the float to provide maximum accuracy of readings when the tester is held with said handle uppermost.

* * * * *